United States Patent Office 3,423,423
Patented Jan. 21, 1969

3,423,423
2-(2,4,5-TRICHLOROBENZYL)-2-IMIDAZOLINE
Halbert C. White, Midland, Mich., assignor to The Dow Chemical Company, Midland, Mich., a corporation of Delaware
No Drawing. Filed Apr. 4, 1967, Ser. No. 628,305
U.S. Cl. 260—309.6            4 Claims
Int. Cl. C07d 49/34

ABSTRACT OF THE DISCLOSURE

The new compound 2-(2,4,5-trichlorobenzyl)-2-imidazoline, and its physiologically-acceptable salts such as the hydrochloride, which have analgesic activity.

---

This invention is concerned with aryl imidazolines and is particularly directed to 2-(2,4,5-trichlorobenzyl)-2-imidazoline and the physiologically-acceptable salts thereof. The term "physiologically-acceptable salt" as herein employed refers to salts of 2-(2,4,5-trichlorobenzyl)-2-imidazoline which are substantially non-toxic at dosages consistent with good analgesic activity. Such physiologically-acceptable salts include non-toxic acid addition salts with inorganic acids such as hydrochloric, hydrobromic, sulfuric or phosphoric acid, or with organic acids such as acetic, succinic, malic, maleic, tartaric or citric acid, or with organic sulfonic acids such as methanesulfonic or p-toluenesulfonic acid. 2-(2,4,5-trichlorobenzyl)-2-imidazoline is a crystalline solid which is of varying degrees of solubility in organic solvents such as 1,2-dichlorobenzene, methylene chloride and alcohols and only slightly soluble in water. The physiologically-acceptable salts of 2-(2,4,5-trichlorobenzyl)-2-imidazoline such as 2-(2,4,5-trichlorobenzyl)-2-imidazoline hydrochloride are soluble in water and slightly soluble in organic solvents such as acetone, benzene and alcohols.

2-(2,4,5-trichlorobenzyl)-2-imidazoline has been found to be useful for administration to laboratory animals in studying the behavior thereof and in studying drug effects on the central and peripheral nervous system. 2-(2,4,5-trichlorobenzyl)-2-imidazoline has been found to be particularly useful as an analgesic. The compound has little or no pharmacological effect in other areas, and it is particularly useful since its analgesic activity is not associated with diuretic activity. For such uses, the preferred form of 2-(2,4,5-trichlorobenzyl)-2-imidazoline is a physiologically-acceptable salt thereof and 2-(2,4,5-trichlorobenzyl)-2-imidazoline is preferably employed in the form of its hydrochloride salt. Other salts, and particularly the tosylate (p-toluenesulfonate), can also be used in the preparation and purification of 2-(2,4,5-trichlorobenzyl)-2-imidazoline and can be converted to the preferred hydrochloride salt.

2-(2,4,5-trichlorobenzyl)-2-imidazoline is prepared by the reaction of 2,4,5-trichlorophenylacetonitrile with ethylenediamine monotosylate to form 2-(2,4,5-trichlorobenzyl)-2-imidazoline tosylate, and the subsequent hydrolysis of the 2-(2,4,5-trichlorobenzyl)-2-imidazoline tosylate in aqueous base to liberate 2-(2,4,5-trichlorobenzyl)-2-imidazoline in the free base form. The reaction proceeds with the evolution of ammonia when the reactants are contacted and mixed, preferably in an inert organic solvent as a reaction medium. Representative and suitable inert organic solvents which can be employed as reaction media include alkylbenzenes, xylenes and halobenzenes. The reaction is preferably carried out under an inert atmosphere with an inert gas being directed through the reaction mixture to carry off ammonia of reaction. The reaction proceeds readily at temperatures from about 150° to about 180° C., and it is preferably carried out under reflux at the boiling temperature of the reaction mixture. The 2-(2,4,5-trichlorobenzyl)-2-imidazoline product precipitates in the reaction mixture as its tosylate (p-toluenesulfonate) salt and the salt can be separated by such conventional methods as filtration, centrifugation or decantation. The 2-(2,4,5-trichlorobenzyl)-2-imidazoline tosylate can be purified by conventional procedures such as recrystallization and washing. The 2-(2,4,5-trichlorobenzyl)-2-imidazoline tosylate can be converted to the free base form of 2-(2,4,5-trichlorobenzyl)-2-imidazoline by hydrolysis in aqueous base. The free base 2-(2,4,5-trichlorobenzyl)-2-imidazoline is then separated by extraction with an organic solvent such as methylene chloride or chloroform, followed by evaporation of the solvent. The product can be purified by conventional methods such as recrystallization, or it can be converted to a physiologically-acceptable salt.

The physiologically-acceptable salts of 2-(2,4,5-trichlorobenzyl)-2-imidazoline can be prepared by dissolving 2-(2,4,5-trichlorobenzyl)-2-imidazoline in a minimal amount of alcohol and adding an alcohol solution of an acid such as hydrochloric acid, hydrobromic acid, malic acid, maleic acid or succinic acid until precipitation of the corresponding salt is complete. Alternately, the free base can be dissolved in a suitable organic solvent such as an alcohol or benzene and the acid can be added directly to the benzene solution to precipitate the salt. The salt can further be purified by recrystallization or converted to the free base form of 2-(2,4,5-trichlorobenzyl)-2-imidazoline.

The free base 2-(2,4,5-trichlorobenzyl)-2-imidazoline can be prepared by hydrolysis of the salt in aqueous base. The salt is mixed with a molar equivalent amount of sodium hydroxide in aqueous solution after which the free base can be separated by extraction with a chlorinated hydrocarbon solvent. The solvent can be removed by conventional methods such as evaporation or distillation and the 2-(2,4,5-trichlorobenzyl)-2-imidazoline can be purified by methods such as recrystallization.

In preparing the compound of the invention, 2,4,5-trichlorophenylacetonitrile, ethylenediamine monotosylate and an inert organic solvent, preferably 1,2-dichlorobenzene, are mixed together. The exact proportions of the reactants to be employed are not critical, some of the desired product being obtained when the reactants are combined in any proportions. However, the reaction consumes the reactants in equimolar proportions and the use of the reactants in such proportions is preferred. Nitrogen is directed through the mixture and the mixture is heated to a temperature within the reaction temperature range until the evolution of ammonia ceases, generally in about 1 to 10 hours. In a convenient procedure, the reaction vessel is vented to a trap containing aqueous hydrochloric acid to react with the ammonia of reaction. The reaction mixture is then cooled and the solvent decanted off. The 2-(2,4,5-trichlorobenzyl)-2-imidazoline tosylate residue can be further purified by recrystallization, or it can be converted to the free base by hydrolysis in aqueous base.

The following examples illustrate the invention but are not to be construed as limiting the same.

EXAMPLE 1

2,4,5-trichlorophenylacetonitrile (33.5 grams; 0.157 mole) was mixed with ethylenediamine monotosylate (36 grams; 0.157 mole) and 100 milliliters of 1,2-dichlorobenzene. Nitrogen gas was directed through the mixture while the mixture was heated at the boiling temperature under reflux for 2.5 hours, during which time a precipitated formed. The ammonia of reaction was collected by passing the exit gases through a gas scrubber containing dilute aqueous hydrochloric acid. The reaction mixture was cooled and the liquid was decanted off. The residue was extracted with 1.5 liters of hot water to obtain 2-(2,4,5-trichlorobenzyl)-2-imidazoline tosylate, having a molecular weight of 435.8, in aqueous solution. The extract was made basic by the addition of about 0.15 mole of sodium hydroxide in aqueous solution, and was then extracted with methylene chloride. The extract was evaporated in vacuo to leave 2-(2,4,5-trichlorobenzyl)-2-imidazoline, having a molecular weight of 263.6, as a residue. The 2-(2,4,5-trichlorobenzyl)-2-imidazoline was dissolved in 100 milliliters of benzene. The solution was acidified by the addition of hydrogen chloride gas by bubbling the dry gas through the benzene solution until precipitation was complete. The mixture was filtered and the 2-(2,4,5-trichlorobenzyl)-2-imidazoline hydrochloride product was collected as a filter cake and found to melt at 290°–293° C. with decomposition. The structure of the product was confirmed by nuclear magnetic resonance spectroscopy.

In substantially the same procedure described above, employing similar inert organic solvents and substituting for the hydrochloric acid an acid capable of forming a physiologically-acceptable acid addition salt, the following 2-(2,4,5-trichlorobenzyl)-2-imidazoline salts are prepared.

2-(2,4,5-trichlorobenzyl)-2-imidazoline hydrobromide, having a molecular weight of 344.5, is prepared by substituting hydrogen bromide in lieu of the hydrogen chloride in the procedure described above.

2-(2,4,5-trichlorobenzyl)-2-imidazoline sulfate, having a molecular weight of 361.7, is prepared by substituting sulfuric acid in lieu of the hydrochloric acid in the procedure described above.

2-(2,4,5-trichlorobenzyl)-2-imidazoline succinate, having a molecular weight of 381.7, is prepared by substituting succinic acid in lieu of the hydrochloric acid in the procedure described above.

2-(2,4,5-trichlorobenzyl)-2-imidazoline maleate, having a molecular weight of 379.7, is prepared by substituting maleic acid in lieu of the hydrochloric acid in the procedure described above.

2-(2,4,5-trichlorobenzyl)-2-imidazoline maleate, having a molecular weight of 397.7, is prepared by substituting malic acid in lieu of the hydrochloric acid in the procedure described above.

EXAMPLE 2

The analgesic activity of 2-(2,4,5-trichlorobenzyl)-2-imidazoline was indicated by the blocking of hydrochloric acid-induced writhing in mice. Groups of mice were administered 2-(2,4,5-trichlorobenzyl)-2-imidazoline hydrochloride at various dosage rates. The mice were subsequently challenged by the intraperitoneal injection of aqueous 0.1 percent hydrochloric acid at a dosage rate of 0.01 milliliter per gram, after which the mice were placed in clear plastic cages and observed. In mice not pretreated with 2-(2,4,5-trichlorobenzyl)-2-imidazoline hydrochloride, the intraperitoneal injection of this dosage of hydrochloric acid is followed by characteristic writhing of the mice, that is, flattening of the abdomen against the floor of the cage accompanied by rotation of the spine and pelvis. The dosage of 2-(2,4,5-trichlorobenzyl)-2-imidazoline hydrochloride which was effective to prevent writhing in 50 percent of the mice (ED 50) was calculated. The ED 50 for the oral administration of the compound was 1.8 milligrams per kilogram.

In other pharmacological tests, 2-(2,4,5-trichlorobenzyl)-2-imidazoline was found to have no significant activity as a hypnosedative, anticonvulsant, antidepressant, tranquilizer or diuretic.

The 2,4,5-trichlorophenylacetonitrile employed as a starting material herein can be prepared by known procedures. For example, α,2,4,5-tetrachlorotoluene (0.36 mole), sodium cyanide (0.40 mole) and 500 milliliters of ethanol are mixed together and heated at 80° C. for five hours. The mixture is cooled, diluted with water and then filtered. The 2,4,5-trichlorophenylacetonitrile is obtained as a filter cake.

I claim:
1. A member of the group consisting of 2-(2,4,5-trichlorobenzyl) - 2 - imidazoline and the physiologically acceptable salts thereof.
2. The compound of claim 1 wherein the compound is 2-(2,4,5-trichlorobenzyl)-2-imidazoline.
3. The compound of claim 1 wherein the compound is 2-(2,4,5-trichlorobenzyl)-2-imidazoline hydrochloride.
4. The compound of claim 1 wherein the compound is 2-(2,4,5-trichlorobenzyl)-2-imidazoline tosylate.

References Cited

UNITED STATES PATENTS 2,919,274   12/1959   Faust et al. _____ 260—309.6

HENRY R. JILES, *Primary Examiner.*

NATALIE TROUSOF, *Assistant Examiner.*

U.S. Cl. X.R.

260—465, 999